United States Patent
Cheng et al.

(10) Patent No.: US 10,416,492 B2
(45) Date of Patent: Sep. 17, 2019

(54) POLARIZER

(71) Applicant: Shenzhen China Star Optoelectronics Technology Co., Ltd., Shenzhen (CN)

(72) Inventors: Xiaoping Cheng, Shenzhen (CN); Yung Jui Lee, Shenzhen (CN); Hsiao Hsien Chen, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 14/897,810

(22) PCT Filed: Sep. 18, 2015

(86) PCT No.: PCT/CN2015/089966
§ 371 (c)(1),
(2) Date: Feb. 6, 2018

(87) PCT Pub. No.: WO2017/041323
PCT Pub. Date: Mar. 16, 2017

(65) Prior Publication Data
US 2018/0157113 A1 Jun. 7, 2018

(30) Foreign Application Priority Data
Sep. 9, 2015 (CN) .......................... 2015 1 0571489

(51) Int. Cl.
*G02B 5/30* (2006.01)
*G02F 1/1335* (2006.01)

(52) U.S. Cl.
CPC ..... *G02F 1/133533* (2013.01); *G02B 5/3016* (2013.01); *G02B 5/3041* (2013.01);
(Continued)

(58) Field of Classification Search
CPC ......... G02F 1/133533; G02F 1/133528; G02F 2202/36; G02B 5/3058; G02B 5/3016;
(Continued)

(56) References Cited

U.S. PATENT DOCUMENTS

2010/0276078 A1* 11/2010 Kitada ................. B32B 37/182
156/247
2012/0274882 A1 11/2012 Jung
(Continued)

FOREIGN PATENT DOCUMENTS

CN 102854558 A 1/2013
CN 103091892 A 5/2013
(Continued)

OTHER PUBLICATIONS

Notification of Transmittal of the International Search Report and the Written Opinion of the International Searching Authority (Forms PCT/ISA/210, PCT/ISA/237, PCT/ISA/220, and PCT/RO/105) dated Jun. 14, 2016, by the State Intellectual Property Office of People's Republic of China in corresponding International Application No. PCT/CN2015/089966. (12 pages).
(Continued)

*Primary Examiner* — William R Alexander
*Assistant Examiner* — Henry A Duong

(57) ABSTRACT

The present disclosure relates to the technical field of display, and in particular, to a polarizer applicable to a display device. The polarizer comprises a stack which at least includes: a functional layer, capable of affecting a polarization direction of an optical wave and converting wavelength of the optical wave, and a protective layer located at an outermost part of the stack. In this manner, two important functions are integrated into the polarizer, which can not only improve the color gamut and the light utilization rate of the display device, but also ensure that light
(Continued)

emitted can have a desired polarization state, thus enhancing the display quality of the display device.

9 Claims, 1 Drawing Sheet

(52) U.S. Cl.
CPC ..... *G02B 5/3058* (2013.01); *G02F 1/133528* (2013.01); *G02F 2202/36* (2013.01)

(58) Field of Classification Search
CPC .... G02B 5/3041; G02B 5/3033; G02B 5/305; G02B 5/3083; Y10T 428/1041
USPC .................................................. 359/487.02
See application file for complete search history.

(56) References Cited

U.S. PATENT DOCUMENTS

| | | | |
|---|---|---|---|
| 2013/0107170 A1 | 5/2013 | Gee et al. | |
| 2013/0135558 A1 | 5/2013 | Kim et al. | |
| 2013/0242228 A1 | 9/2013 | Park et al. | |
| 2016/0025912 A1* | 1/2016 | Zeng | G02B 5/3083 359/489.01 |
| 2016/0075943 A1 | 3/2016 | Kim et al. | |
| 2016/0085102 A1* | 3/2016 | Ohmuro | G02B 5/305 349/61 |
| 2017/0219878 A1 | 8/2017 | Liu | |

FOREIGN PATENT DOCUMENTS

| | | |
|---|---|---|
| CN | 103135281 A | 6/2013 |
| CN | 104680942 A | 6/2015 |
| CN | 204389726 U | 6/2015 |
| CN | 104749681 A | 7/2015 |
| CN | 105158960 A | 12/2015 |

OTHER PUBLICATIONS

Office Action dated Jul. 26, 2017, by the State Intellectual Property Office of Peoples Republic of China in corresponding Chinese Patent Application No. 201510571489.2. (6 pages).

* cited by examiner

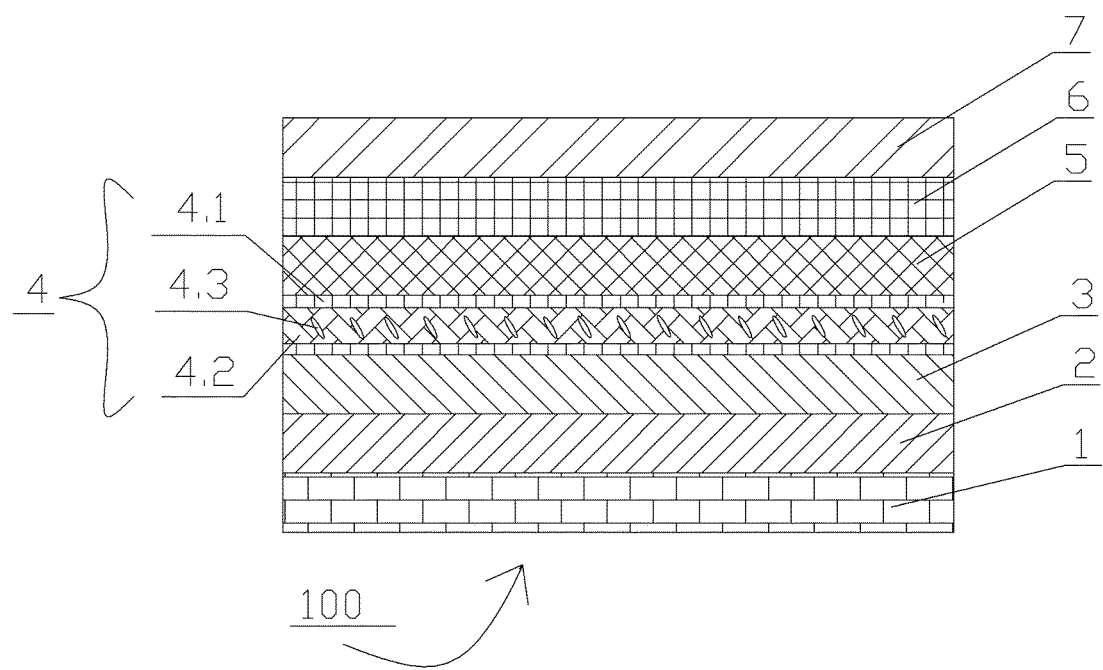

POLARIZER

CROSS-REFERENCE TO RELATED APPLICATIONS

The present application claims the priority of Chinese patent application CN201510571489.2, entitled "Polarizer" and filed on Sep. 9, 2015, the entirety of which is incorporated herein by reference.

TECHNICAL FIELD

The present disclosure relates to the technical field of display, and in particular, to a polarizer applicable to display devices.

TECHNICAL BACKGROUND

With the development of technology and the progress of society, people are becoming more and more dependent on information exchange and transfer. Display devices, as an important carrier and material base for information exchange and transfer, have become the most sought-after target in the technical field of information photo-electronics.

Quantum dots are extremely small inorganic nanocrystals that are invisible to the naked eye. Quantum dots can emit color light in response to light or electricity. The color of light emitted by a quantum dot is determined by the composition, size and shape of the quantum dot. Usually, smaller quantum dots absorb longer waves, and larger quantum dots absorb shorter waves. For example, a particular sized quantum dot can absorb the blue light which has a short wavelength and emit a color light which has a long wavelength. This causes quantum dots to be able to convert the color of the light emitted by a light source.

Quantum dot display technology has been comprehensively improved in the improvement of color gamut, color control accuracy, and purity of red, green and blue light, and has been considered as a "commanding height" of global display technology and a universally influential revolution in display technology. Quantum dot display technology achieves full gamut display and results in display with accurate colors.

Quantum rods are semi-conductor nanocrystals with a cross-sectional radius smaller than 20 nm and a length of about tens of nanometers. Quantum rods are mostly made up of materials comprising group II-VI elements or group III-V elements. Quantum confinement effect can be observed in quantum-rod materials. Specifically, the movement of electrons and electron holes within a quantum rod can be restricted, which enables the original continuous energy band to become discrete energy levels. Confinement degree of electrons and electron holes varies with the size of the quantum rod, and different confinement degree will result in different discrete energy levels. In response to external excitation, different sized quantum rods can emit light with different wavelengths—different color light.

Quantum rods have the following advantages. The size of quantum rods is adjustable. By tuning the size of quantum rods, the wavelength range of the light emitted can be caused to cover the waveband of the infrared light and the waveband of the entire visible light. The light emitted has a narrow waveband and high saturation degree of color. Quantum-rod materials are efficient in optical wave conversion, stable in property, and easy to be prepared in diverse ways. For example, they can be prepared from various solutions and thus the resources are abundant.

However, when light passes through the irregularly arranged quantum rods, the polarization direction of the emergent light is random. If, when the divergent light from the irregularly arranged quantum rods passes through liquid crystals, the light at each pixel cannot be well controlled any more, light leak will thus occur in the liquid crystal display (LCD) device. A LCD device takes advantage of the optical activity and double refraction of liquid crystals. By controlling the rotation of the liquid crystals with voltage, linearly polarized light passing through an upper polarizer rotates, and then shines out from a lower polarizer (whose polarizer axis is perpendicular to that of the upper polarizer). In this manner, the polarizer and the liquid crystal cell together function as an optical switching. This optical switching, apparently, cannot completely control the light emitted from the irregularly arranged quantum rods.

SUMMARY OF THE INVENTION

The present disclosure provides a polarizer which is intended to solve the above problem of the existing technologies, i.e., when light passes through the irregularly arranged quantum rods, the polarization direction of the emergent light is random, which is not applicable to a liquid crystal display (LCD) device.

The polarizer provided by the present disclosure comprises a stack which at least includes: a functional layer, capable of affecting a polarization direction of an optical wave and converting a wavelength of the optical wave, and a protective layer located at an outermost part of the stack. In this manner, two important functions are integrated into the polarizer, which can not only improve the color gamut and the light utilization rate of the display device, but also ensure that light emitted can have a desired polarization state, thus enhancing the display quality of the display device.

In one embodiment, the functional layer is constructed by adding a quantum-rod material to a light polarizing material. In the present disclosure, by mixing the quantum-rod material with the light polarizing material, the process of forming the polarizer can be simplified, better polarizing effects and more importantly, wider color gamut coverage can be achieved.

In one embodiment, the quantum-rod material is added to the light polarizing material by surface grafting or surface coating, which can achieve a more uniform and steadier mixture of the quantum-rod material and the light polarizing material.

In one embodiment, film formation of the functional layer is implemented by spray coating, spin coating, printing or slit coating. It can thus be seen that in the technical solution of the present disclosure, the selection of specific processes is very flexible.

In one embodiment, proportion of the quantum-rod material and proportion of the light polarizing material can be adjusted by increasing or decreasing the content of a treating agent, resin, or a solvent. That is, in the present disclosure, in order to achieve a better mixing effect in the functional layer of the polarizer, the proportion of each component of the functional layer can be easily changed.

In one embodiment, the light polarizing material comprises dye molecules.

In one embodiment, quantum-rod structures of the quantum-rod material and the dye molecules of the light polarizing material are regularly arranged so that the functional layer can filter the polarization direction of the optical wave. With the increase of the aspect ratio of the geometric shape of the quantum-rod material, light emitted from the quantum-rod material is converted from circular polarized light into linear polarized light. Therefore, the quantum-rod structures are entirely capable of converting a polarization state of incident light.

In one embodiment, the arrangement of the quantum-rod structures and the dye molecules in the specific rule can be achieved by stretching, friction, self-assembling, optical irradiation, or electric driving. It can thus be seen that the technical solution of the present disclosure is very flexible in the selection of specific processes.

In one embodiment, the functional layer comprises: a layer of a light polarizing material comprising dye molecules; a quantum-rod material dispersed in the light polarizing material and having a quantum-rod structure; and triacetate layers provided on both sides of the light polarizing material. The triacetate layers have good light transmissivity and water resistance property and a certain degree of mechanical strength, and can therefore protect the light polarizing material and the quantum-rod material.

In one embodiment, the polarizer, from one side thereof to the other side thereof, comprises a first protective film, a first release film, a first bonding layer, the functional layer, a second bonding layer, a second release film, and a second protective film. The first release film and the second release film protect the first bonding layer and the second bonding layer, respectively. The first protective layer and the second protective layer located at the outmost part of the polarizer provide chemical and mechanical protection for the polarizer as a whole.

In a summary, the polarizer provided by the present disclosure, while improving the color gamut by taking advantage of the quantum rod's capability of converting wavelengths, is able to solve the problem of insufficient degree of light polarization of traditional quantum components. By providing the quantum-rod structures in the multi-layer polarizer, and mixing the quantum-rod material with the light polarizing material, the manufacturing process of the polarizer is greatly simplified.

The above technical features can be combined with one another in various proper ways or replaced by equivalent technical features, as long as the objective of the present disclosure can be achieved.

BRIEF DESCRIPTION OF THE DRAWINGS

The present disclosure will be further illustrated based on the following embodiments in conjunction with the accompanying drawings, in which:

FIG. 1 schematically shows a polarizer according to the present disclosure.

In the drawing, same components are indicated with same reference numbers. The figures are not drawn to scale.

DETAILED DESCRIPTION OF THE EMBODIMENTS

The present disclosure will be illustrated in detail below with reference to the accompanying drawings.

A polarizer provided by the present disclosure comprises a stack which at least includes: a functional layer, capable of affecting a polarization direction of an optical wave and converting a wavelength of the optical wave, and a protective layer located at an outermost part of the stack.

Specifically, FIG. 1 shows a polarizer 100 according to the present disclosure. The polarizer 100, from one side thereof to the other side thereof, comprises a first protective film 1, a first release film 2, a first bonding layer 3, the functional layer 4, a second bonding layer 5, a second release film 6, and a second protective film 7.

The functional layer 4 comprises: a layer of a light polarizing material 4.2 comprising dye molecules; a quantum-rod material 4.3 dispersed in the light polarizing material 4.2 and having quantum-rod structures; and triacetate layers 4.1 provided on both sides of the light polarizing material 4.2. With the increase of the aspect ratio of the geometric shape of the quantum-rod material, light emitted from the quantum-rod material is converted from circular polarized light into linear polarized light. Therefore, the quantum-rod structures are entirely capable of converting a polarization state of an incident light. The triacetate layers 4.1 have good transmissivity and water resistance property, and a certain degree of mechanical strength, and can hence protect the light polarizing material 4.2 and the quantum-rod material 4.3.

The quantum-rod material 4.3, for example, can be dispersed uniformly in the light polarizing material 4.2.

The functional layer 4 may be constructed by adding the quantum-rod material 4.3 to the light polarizing material 4.2. Preferably, the quantum-rod material 4.3 is added to the light polarizing material 4.2 by surface grafting or surface coating. Therefore, a more uniform and steadier mixture of the quantum-rod material 4.3 and the light polarizing material 4.2 can be achieved by various means such as surface grafting or surface coating.

The light polarizing material 4.2 comprises dye molecules. The quantum-rod structures of the quantum-rod material 4.3 and the dye molecules of the light polarizing material 4.2 can be arranged in a specific rule, so that the functional layer 4 can filter the polarization direction of the optical wave. Specifically, the arrangement of the quantum-rod structures of the quantum-rod material 4.3 and the dye molecules of the light polarizing material 4.2 in the specific rule can be achieved by stretching, friction, self-assembling, optical irradiation, or electric driving.

By providing the quantum-rod structures in the multi-layer polarizer, and mixing the quantum-rod structures with the light polarizing material capable of polarizing light, the polarizer, while improving the color gamut, solves the problem of insufficient degree of light polarization of traditional quantum components.

The functional layer 4 having quantum-dot structures is obtained after a film is formed from the mixed material. The film formation of the functional layer 4 can be implemented by spray coating, spin coating, printing, or slit coating, etc.

Proportion of the quantum-rod material 4.3 and proportion of the light polarizing material 4.2 can be adjusted by increasing or decreasing the content of a treating agent, resin, or a solvent. That is, in the embodiments of the present disclosure, the formula of the functional layer 4 does not always remain the same. In order to achieve a better mixing effect, the proportion of each component of the functional layer 4 can be changed by simply increasing or decreasing the content of a treating agent, resin, or a solvent.

The quantum-rod material 4.3 may be made of elements from groups IIB and VIA or from groups IIIA and VA. Optionally, the quantum-rod material 4.3 may be made of a single-element quantum-rod material, a typical example thereof being carbon quantum-rod material.

The quantum-rod material 4.3 may also be made of a semi-conductor material or a mixture of more than two semi-conductor materials selected from, for example, CdS, CdSe, CdTe, ZnSe, InP, and InAs.

As can be seen, in the embodiments of the present disclosure, there is no specific restriction to the components of the quantum-rod material 4.3, as long as a material selected is suitable for improving the color gamut and achieving a good mixing effect.

The quantum-rod material 4.3 may be an oil-soluble or water-soluble material, and no specific restriction is made in the selection of either of the two.

The quantum-rod structure is usually a nanoparticle with a cross-sectional radius smaller than 20 nm and with a length of about tens of nanometers.

The first bonding layer 3 and the second bonding layer 5 may be formed from, for example, a pressure sensitive adhesive. The pressure sensitive adhesive may be thermo-stable and moisture-proof. The first bonding layer 3 and the second bonding layer 5 may be made of a polar or non-polar material, and no specific restriction is made in the selection of either of the two. Specifically, the first bonding layer 3 and the second bonding layer 5 may be made of epoxy resin.

The first release film 2 and the second release film 6 protect the first bonding layer 3 and the second bonding layer 5, respectively. The first protective layer 1 and the second protective layer 7 located at the outmost part of the polarizer provide chemical and mechanical protection for the polarizer 100 as a whole.

In the quantum display devices manufactured according to traditional methods, polarization of light in LCD devices is mostly neglected. The light emitted from the irregularly arranged quantum rods in response to excitation is divergent, which enables the linear polarized light in a liquid crystal cell derived after the light passes through the polarizer to become non-polarized light again. This is negative to control of light by the liquid crystal layer, and is likely to result in light leak, as a consequence of which, the contrast of the entire display device will be reduced. The technical solution of the existing technologies is thus not a desired structural solution. It is therefore necessary to eliminate the negative effect (the problem of polarization of light) caused by introduction of quantum material in the display device in order to obtain a better display device. In the technical solution of the present disclosure as illustrated above, the quantum-rod material and the light polarizing material are mixed together. By placing the quantum-rod structures into the light polarizing material (the light polarizing material comprises dye molecules), and even by arranging the quantum-rod structures and the dye molecules of the light polarizing material in a specific rule, the process for forming the polarizer is simplified, a better light polarization effect is produced, and more importantly, a wider color gamut is achieved. This perfectly solves the technical problem of the existing technologies.

The polarizer provided by the present disclosure also has the following advantages.

(1) The technical solution of the present disclosure does not define the location of the functional layer (capable of polarizing light and converting wavelength) in the multiple-layers of the entire polarizer. Said location can be adjusted as required by a specific application, though the accompanying drawing above has shown an embodiment of the polarizer of the present disclosure.

(2) The technical solution of the present disclosure does not specifically define the location of the color filter layer, the location of the array substrate, and the location of the black matrix of the LCD device. The technical solution therefore has a wide application, and can be used flexibly in various ways.

(3) The technical solution of the present disclosure is applicable to the new developed techniques such as BOA (BM on array) technique in which black matrix and array substrate are integrated together, COA (Color-filter on Array) technique in which color filter and array substrate are integrated together, and GOA (Gate driver on Array) technique in which the gate driver and an array substrate are integrated together.

(4) The polarizer provided by the present disclosure can be used as an upper polarizer (polarizer on an array substrate) or a lower polarizer (color filter substrate) in a traditional LCD device.

(5) The functional layer described above (capable of polarizing light and converting wavelength) can also be used as other internal layers or external layers for achieving a similar function or other corresponding functions.

(6) The technical solution of the present disclosure does not specifically define the drive mode of the LCD device or the control mode of liquid crystals, and is applicable to IPS (In-Plane Switching) mode, TN (Twisted Nematic) mode, VA (vertical alignment) mode, OLED (Organic Light Emitting Diode) mode, QLED (Quantum Dots Light Emitting Diode) mode, etc.

The present disclosure is described above with reference to specific embodiments, but it should be noted that these embodiments are merely exemplary of the principles and applications of the present disclosure. It should therefore be understood that the exemplary embodiments can be amended in various ways and other designs can also be provided without departure from the spirit and scope of the present disclosure. One should also understand that different features in the dependent claims and the description can be combined in ways different from those described in the original claims, and that a combination of features in one embodiment can be used in other embodiments.

The invention claimed is:

1. A polarizer, comprising a stack which at least includes:
a functional layer, capable of affecting a polarization direction of an optical wave and converting wavelength of the optical wave, wherein the functional layer is a single layer constructed by adding a quantum-rod material to a light polarizing material so that quantum-rod structures of the quantum-rod material are interspersed in the light polarizing material, and
a protective layer located at an outermost part of the stack.

2. The polarizer according to claim 1, wherein the quantum-rod material is arranged to be added to the light polarizing material by surface grafting or surface coating.

3. The polarizer according to claim 1, wherein film formation of the functional layer is arranged to be implemented by spray coating, spin coating, printing, or slit coating.

4. The polarizer according to claim 1, wherein proportion of the quantum-rod material and proportion of the light polarizing material is arranged to be adjusted by increasing or decreasing content of a treating agent, resin, or a solvent.

5. The polarizer according to claim 1, wherein the light polarizing material comprises dye molecules.

6. The polarizer according to claim 5, wherein quantum-rod structures of the quantum-rod material are interspersed within the dye molecules of the light polarizing material, and are arranged to be inclined with a same specific angle, so that the functional layer has a capability of filtering the polarization direction of the optical wave.

7. The polarizer according to claim 6, wherein inclined arrangement of the quantum-rod structures within the dye molecules is achieved by stretching, friction, self-assembling, optical irradiation, or electric driving.

8. The polarizer according to claim 1, wherein the functional layer comprises:
- a layer of a light polarizing material comprising dye molecules;
- a quantum-rod material dispersed in the light polarizing material and having quantum-rod structures; and
- triacetate layers provided on both sides of the light polarizing material.

9. The polarizer according to claim 8, from one side thereof to another side thereof, comprising: a first protective film, a first release film, a first bonding layer, the functional layer, a second bonding layer, a second release film, and a second protective film.

* * * * *